No. 850,257. PATENTED APR. 16, 1907.
C. H. SCHABINGER.
GEAR TRANSMISSION MECHANISM.
APPLICATION FILED OCT. 20, 1906.

3 SHEETS—SHEET 1.

Witnesses:
W. N. Woodson.
E. T. Keaser.

Inventor
C. H. Schabinger
By
Attorneys

No. 850,257.　　　　　　　　　　　　　　PATENTED APR. 16, 1907.
C. H. SCHABINGER.
GEAR TRANSMISSION MECHANISM.
APPLICATION FILED OCT. 20, 1906.

3 SHEETS—SHEET 2.

Witnesses:
W. N. Woodson
G. T. Keaser

Inventor
C. H. Schabinger
By Attorneys
R. & A. B. Lacey

No. 850,257. PATENTED APR. 16, 1907.
C. H. SCHABINGER.
GEAR TRANSMISSION MECHANISM.
APPLICATION FILED OCT. 20, 1906.
3 SHEETS—SHEET 3.
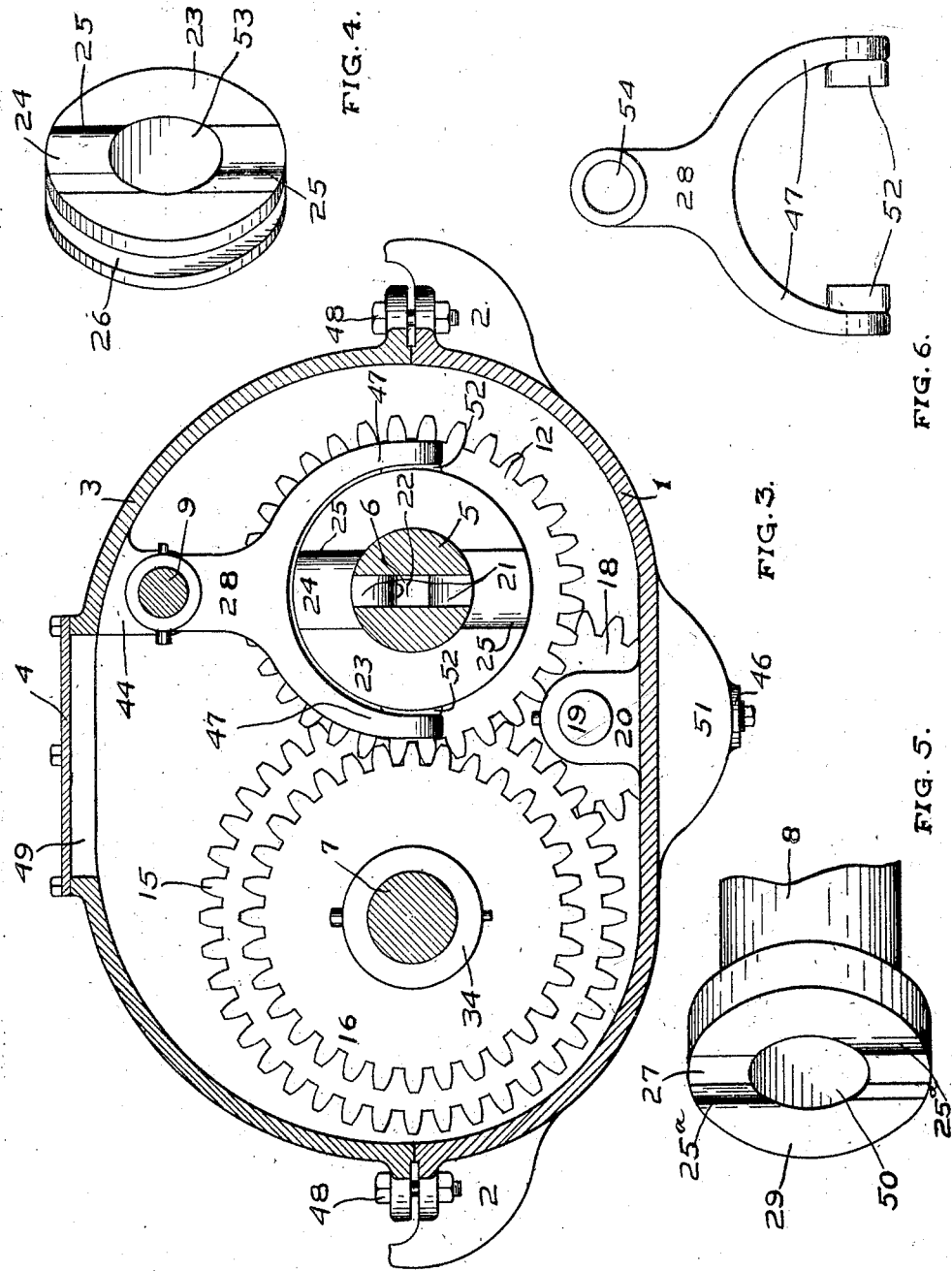

UNITED STATES PATENT OFFICE.

CHARLES H. SCHABINGER, OF DETROIT, MICHIGAN.

GEAR-TRANSMISSION MECHANISM.

No. 850,257.

Specification of Letters Patent.

Patented April 16, 1907.

Application filed October 20, 1906. Serial No. 339,873.

*To all whom it may concern:*

Be it known that I, CHARLES H. SCHABINGER, a citizen of the United States, residing at Detroit, in the county of Wayne and State of Michigan, have invented certain new and useful Improvements in Gear-Transmission Mechanism, of which the following is a specification.

Figure 1:
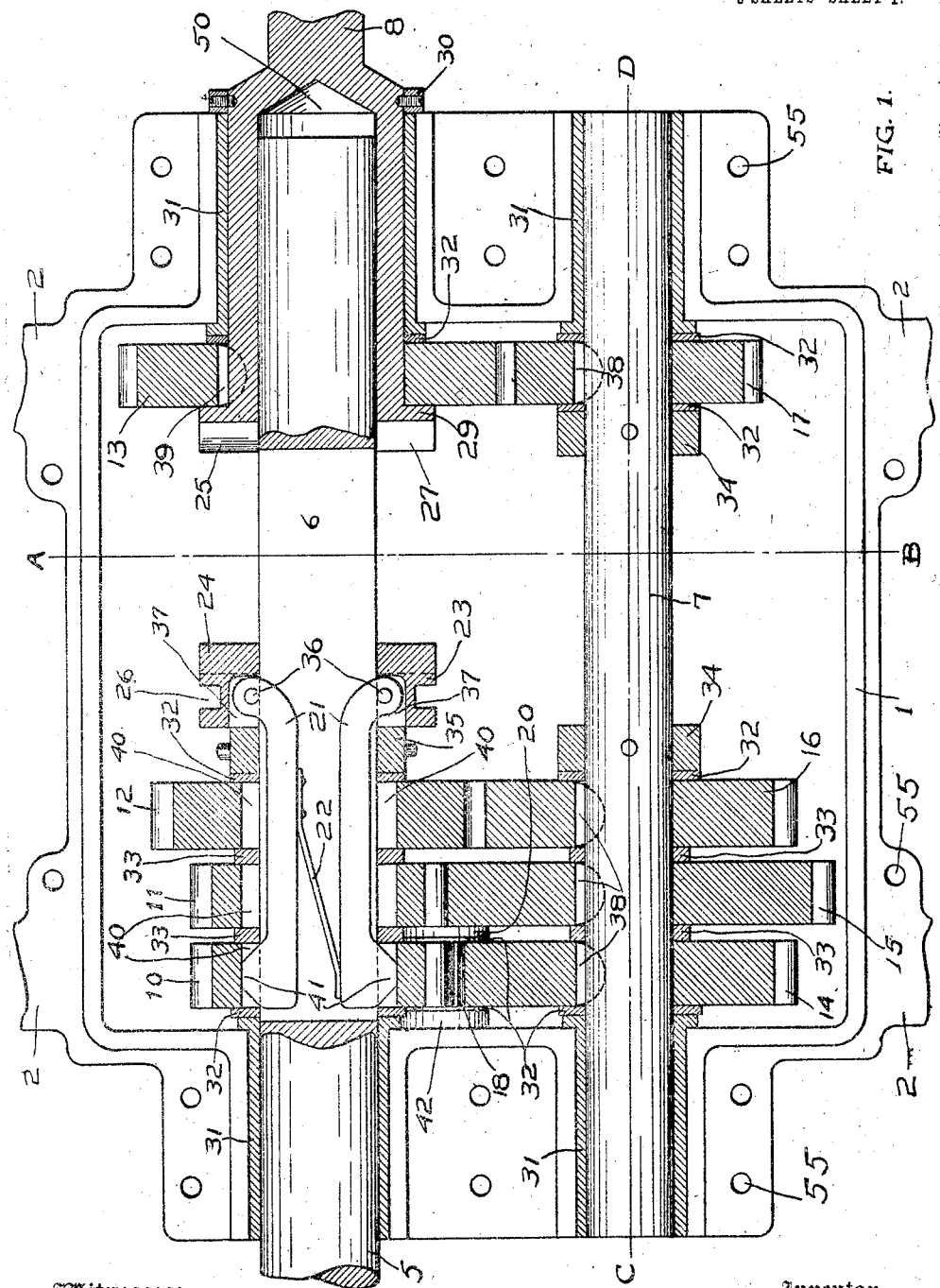
Figure 2:
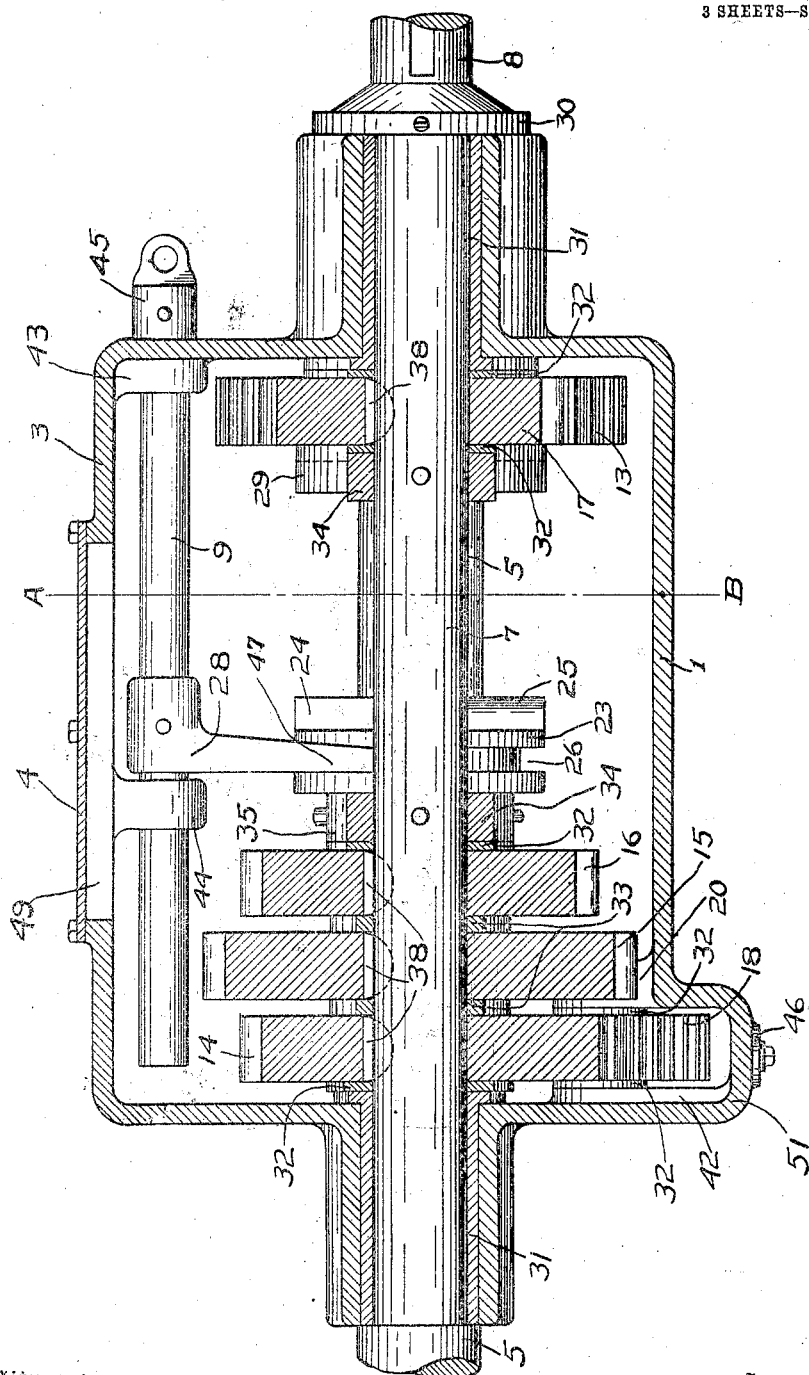

The object of my invention is to provide an improved gear-transmission mechanism particularly adapted for automobiles, motorboats, and the like, but susceptible of use in changing the speed or reversing the motion of any driven shaft.
For a full understanding of the invention and the merits thereof and also to acquire a knowledge of the details of construction reference is to be had to the following description and accompanying drawings, in which—
Figure 1 is a horizontal sectional view of my improved gear-transmission mechanism. Fig. 2 is a longitudinal sectional view of the same, the section being taken approximately on the line C D of Fig. 1. Fig. 3 is a transverse section taken approximately on the line A B of Figs. 1 and 2 and looking toward the left. Fig. 4 is a detail perspective view of the male clutch member detached. Fig. 5 is a similar view, partially broken away, of the complemental clutch member; and Fig. 6 is a detail view of the shifting-fork detached.

Corresponding and like parts are referred to in the following description and indicated in all the views of the drawings by the same reference characters.

The case to inclose the operative parts of my improved gear-transmission mechanism may be of any desired construction and design, and in the present instance said case embodies a lower section 1, provided with ears 2, by which it may be secured by bolts 48 or the like to the top section 3. The section 3 may be provided at its top with a hand-hole 49, provided with a closure 4.

5 designates the drive-shaft, which is arranged to be coupled to the motor or prime mover (not shown) by any suitable means, and said shaft is journaled in a bushing 31 or by means of ball-bearings within the case and is also journaled at one end within a preferably cylindrical bearing 50 in the sleeve 8, said sleeve being also journaled in the opposite end of the casing by means of a bushing 31 or by ball-bearings. The sleeve 8 is reduced at its projecting end and constitutes a portion of the driven shaft, which is operatively connected to the rear wheels of the automobile or to the parts to be driven in any suitable manner.
30 designates a collar secured to the sleeve member 8, and 32 designates a washer which encircles the sleeve bearing within the case and bears against the inner side of the adjacent bushing 31.
The drive-shaft 5 is provided with a longitudinal slot or space 6 within the case, and a male clutch member 23 is provided with a bore 53, by which it is mounted on the said shaft and is provided with recesses 37, within which the pivoted ends of the keys 21 are located and are mounted upon pins 36. The keys 21 extend longitudinally within the slots 6 of the drive-shaft 5, and their free ends are pressed outwardly by a spring 22, which is riveted or otherwise secured to one of the keys 21 and bears against the other, as best shown in Fig. 1. The outer free ends of the keys 21 are provided with oppositely-extending beveled lugs 41.
The drive-shaft 5 carries a plurality of gear-wheels which are loose thereon. In the present instance three of these gears are shown, (designated 10, 11, and 12,) and said gears are provided with interposed washers 33 to keep them properly spaced, and also with outside washers 32, one of which bears against the adjacent bushing 31 and the other of which bears against a collar 35, keyed on the shaft 5, and interposed between the said washer and the male clutch member 23. Each of the gear-wheels 10, 11, and 12 is provided with keyways 40, located diametrically opposite to each other and designed to receive the beveled lugs 41 on the outer ends of the keys 21 for the purpose of rigidly securing the said gear-wheels upon the shaft.

In order to shift the male clutch member 23 back and forth upon the shaft 5 to effect the coupling connection of any one of the wheels 10, 11, and 12 with the shaft, I provide the shifting-fork 28, the two arms 47 of which are provided at their extremities with lugs or rollers 52, working within an annular groove 26 on said clutch member. The main extension of the shifting-fork is provided with a bore 54, which receives the shifting-rod 9, and the shifting-fork is pinned or otherwise fixed to said rod. The rod 9 is mounted to have a longitudinal sliding movement in the case and is supported by means of an apertured depending lug 44 intermediate of the ends of the case and a boss 43. One end of the shifting-rod 9 projects outside of the case, as indicated at 45, and is arranged for connection in any suitable manner to the shifting-lever. (Not shown.)

The male clutch member 23 is provided with tongues 24, which are shown as diametrically opposite and which are beveled at one side, as indicated at 25, so as to slip more readily in the diametrically opposite grooves 27 of the female clutch member 29, which in the present instance is formed on the inner end of the sleeve which is connected to the driven shaft 8. The grooves 27 are also beveled at one side, as indicated at 25°, to enable the tongues 24 to slip therein with ease. By this means the drive-shaft 5 may be coupled for direct driving connection with the driven shaft 8.

Mounted within the case on the sleeve of the driven shaft 8 is a gear-wheel 13, fixed on said sleeve by a key 39 or the like. This gear-wheel is connected to the counter-shaft 7, extending from end to end of the case alongside of the shaft 5 and journaled at its ends in bushings 31 or in any other desired form of bearing. The connection is effected by means of a gear-wheel 17 held on the shaft 7, as by a key 38 or the like, and interposed between two washers 32, against one of which bears a thrust-collar 34, keyed or pinned on the shaft. The counter-shaft 7 also carries gear-wheels 14, 15, and 16, which are all fixed thereon, as by keys 38, and are provided with spacing-washers 33 and outer washers 32, against one of which a thrust-collar 34 bears, as shown. The gear-wheels 15 and 16 mesh with the gear-wheels 11 and 12, respectively, while the gear-wheel 14 meshes with a reversing pinion or gear 18, which also meshes with the gear-wheel 10. The reversing-gear 18 is mounted on a shaft 19, journaled between two bosses 42 and 20 within the casing. The bottom portion of the casing may be provided with an extension 51, to which a drain-cock 46 may be attached for the purpose of draining off oil.

In the practical operation of my improved gear-transmission mechanism it is manifest that the drive-shaft 5 may be coupled directly to the driven shaft 8 by shifting the rod 9, so as to carry the fork 28 to the right and cause the interengagement of the two clutch members 23 and 29. In this direct coupling engagement of the parts the male clutch member 23 will be moved over into a position where the beveled lugs 41 of the keys 21 are located within the thrust-collar 35. To reverse the motion of the driven shaft 8, the shifting-rod 9 is moved in the opposite direction, the keys 21 being carried successively through the keyways of the gears 11 and 12 and slipping past the interposed collars 33 by means of the beveled formation of the lugs 41, and said lugs finally spring up within the keyways of the gear 10, so as to couple this gear with the drive-shaft 5. As the gear-wheel 10 meshes with the reversing-gear 18, which in turn meshes with the gear-wheel 14, it is obvious that the counter-shaft 7 will be rotated in a direction to cause a reverse movement to be imparted to the driven shaft 8 through the intermeshing connection of said shaft and the counter-shaft by means of the two gear-wheels 13 and 17. To vary the speed of the driven shaft 8, the shifting-rod 9 is moved, so as to carry the beveled ends of the keys 21 into the keyways of either of the gear-wheels 11 or 12, and as these gears vary relatively to the gear-wheels 15 and 16 a consequent variation in speed will be effected.

From the foregoing description, in connection with the accompanying drawings, it will be seen that I have provided an improved gear-transmission mechanism which will be effective at all times through the operation of a single shifting-lever to either reverse the motion of a driven shaft or vary the speed of the same and that the construction is a very simple one and durable and not liable to get out of order.

In the operation the motion is always transmitted (except when the shafts 5 and 8 are directly coupled) through the counter-shaft 7 and back to the driven shaft by means of the gear-wheels 17 and 13.

Having thus described the invention, what is claimed as new is—

1. In a gear-transmission mechanism, the combination of a drive-shaft and a shaft to be driven, a clutch member fast on said driven shaft, the drive-shaft being provided with a keyway, a loose gear-wheel on the drive-shaft and provided with a keyway adapted to register with the keyway of said shaft, a clutch member movable longitudinally on the drive-shaft and provided with a key working in the keyway of said shaft, means whereby said key will enter the keyway of the loose gear-wheel when the clutch member is moved in one direction, a gearing connection between said loose gear-wheel and the shaft to be driven, and means whereby the said clutch member may be caused to engage the first-named clutch member whereby to directly couple the drive-shaft to the driven shaft.

2. In a gear-transmission mechanism, the combination of a drive-shaft and a shaft to be driven, a clutch member fast on said driven shaft, the drive-shaft being provided with a keyway, loose gear-wheels on the drive-shaft and provided with keyways adapted to register with the keyways of said shaft, a clutch member movable longitudinally on the drive-shaft and provided with a key working in the keyway of said shaft, a thrust-collar interposed between said clutch member and the adjacent loose gear-wheel on the drive-shaft, means whereby said key will enter the keyways of the respective loose gear-wheels when the clutch member is moved in one direction, a gearing connection between said loose gear-wheels and the shaft to be driven, and means whereby said clutch member may be caused to engage the first-named clutch member whereby to directly couple the drive-shaft to the driven shaft, the proportion of parts being such that in this direct coupling engagement, the key of the clutch will rest within the said thrust-collar.

3. In a gear-transmission mechanism, the combination of a shaft to be driven, said shaft being provided at one end with a hollow sleeve and a clutch member formed on the end of said sleeve, a fast gear-wheel on said sleeve, a driving-shaft having one end journaled in said sleeve, a series of loose gears mounted on the drive-shaft in spaced relation to the fast gear-wheel and clutch member of the driven shaft, a complemental clutch member mounted to turn with and movable longitudinally on the drive-shaft in the space between said loose gear-wheels and the fast gear-wheel and other clutch member, and mounted for direct coupling engagement with said other clutch member whereby to directly couple the drive-shaft to the driven shaft, means for coupling said complemental clutch member to any one of said loose gears on the drive-shaft, and other gearing operatively connecting the said loose gear-wheels with the fast gear-wheel on the driven shaft.

4. In a gear-transmission mechanism, the combination of a shaft to be driven, said shaft being provided at one end with a hollow sleeve and a clutch member formed on the end of said sleeve, a fast gear-wheel on said sleeve, a driving-shaft having one end journaled in said sleeve, a series of loose gears mounted on the drive-shaft in spaced relation to the fast gear-wheel and clutch member of the drive-shaft, a complemental clutch member mounted to turn with and movable longitudinally on the drive-shaft in the space between said loose gear-wheels and the fast gear-wheel and other clutch member, and mounted for direct coupling engagement with said other clutch member whereby to directly couple the drive-shaft to the driven shaft, means for coupling said complemental clutch member to any one of said loose gears on the drive-shaft, a counter-shaft, a fast gear-wheel on said counter-shaft and meshing with the fast gear-wheel on the driven shaft, and other fast gear-wheels on the counter-shaft in spaced relation to the first-named gear-wheel on said shaft, and operatively connected with the respective loose gears on the drive-shaft.

In testimony whereof I affix my signature in presence of two witnesses.

CHARLES H. SCHABINGER. [L. S.]

Witnesses:
 H. L. SCHABINGER,
 EDGAR RAYMOND.